US012689196B2

(12) United States Patent
Palmer

(10) Patent No.: US 12,689,196 B2
(45) Date of Patent: Jul. 21, 2026

(54) ELECTRICAL DEVICE ALIGNMENTS

(71) Applicant: Snap One, LLC, Salt Lake City, UT (US)

(72) Inventor: Matthew Thomas Palmer, Sandy, UT (US)

(73) Assignee: Snap One, LLC, Salt Lake City, UT (US)

( * ) Notice: Subject to any disclaimer, the term of this patent is extended or adjusted under 35 U.S.C. 154(b) by 745 days.

(21) Appl. No.: 17/880,468

(22) Filed: Aug. 3, 2022

(65) Prior Publication Data

US 2024/0047953 A1 Feb. 8, 2024

(51) Int. Cl.
*H02G 3/08* (2006.01)
*H02G 3/10* (2006.01)
*H02G 3/14* (2006.01)
(52) U.S. Cl.
CPC ............... *H02G 3/081* (2013.01); *H02G 3/10* (2013.01); *H02G 3/14* (2013.01)
(58) Field of Classification Search
CPC ............. H02G 3/081; H02G 3/10; H02G 3/14
See application file for complete search history.

(56) References Cited

U.S. PATENT DOCUMENTS

| | | | | |
|---|---|---|---|---|
| 6,005,308 A | * | 12/1999 | Bryde | H05B 39/08 |
| | | | | 307/157 |
| 2006/0065510 A1 | * | 3/2006 | Kiko | H01H 11/0031 |
| | | | | 200/1 R |
| 2015/0213978 A1 | * | 7/2015 | Madsen | H02G 3/14 |
| | | | | 200/5 A |
| 2016/0020590 A1 | * | 1/2016 | Roosli | H02G 3/081 |
| | | | | 361/679.31 |
| 2016/0226232 A1 | * | 8/2016 | Gagne | H02G 3/123 |
| 2017/0278652 A1 | * | 9/2017 | Dimberg | H01H 9/287 |
| 2018/0122601 A1 | * | 5/2018 | Wisniewski | H01H 23/145 |
| 2020/0106250 A1 | * | 4/2020 | Jackson | H02G 3/14 |

* cited by examiner

*Primary Examiner* — Steven T Sawyer
(74) *Attorney, Agent, or Firm* — Greenberg Traurig LLP; Nicholas Martin; David J. Dykeman

(57) ABSTRACT

Examples of electrical devices are described herein. In some examples, an electrical device includes a yoke plate including a first screw hole and a second screw hole. The electrical device includes a base including a third screw hole disposed to permit passage of a first screw through the third screw hole and the first screw hole. The electrical device includes a subplate including a fourth screw hole disposed to permit a second screw to attach the subplate to the yoke plate through the fourth screw hole and the second screw hole. The subplate includes a channel to expose the third screw hole to a facial side of the subplate.

12 Claims, 5 Drawing Sheets

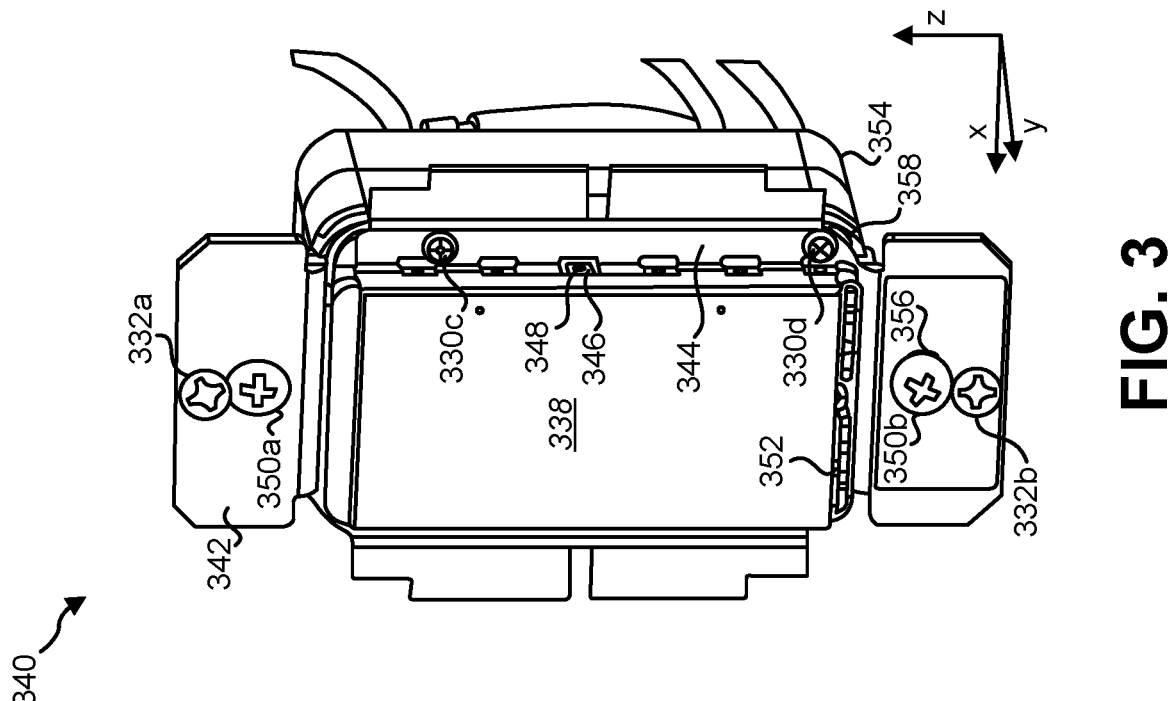
FIG. 3
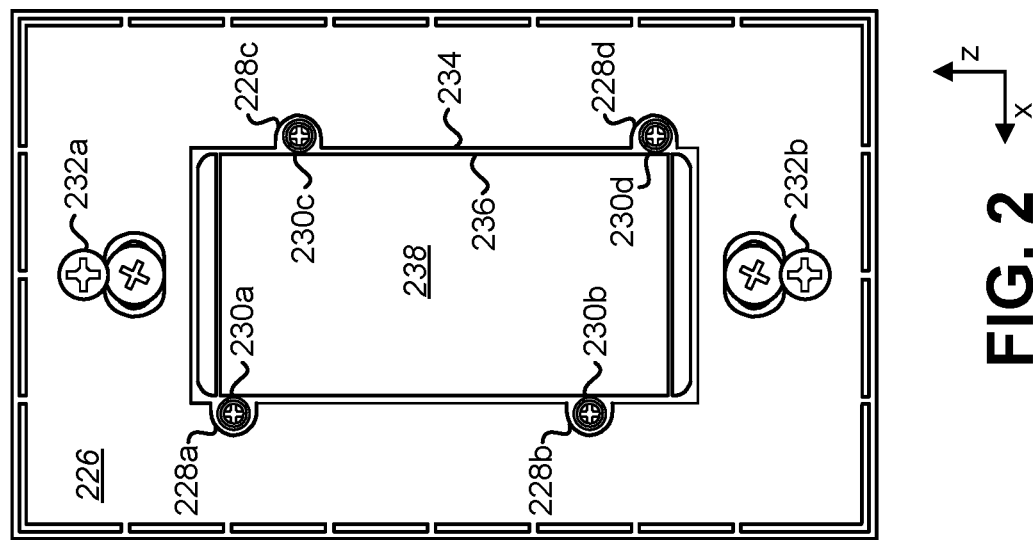
FIG. 2

ELECTRICAL DEVICE ALIGNMENTS

TECHNICAL FIELD

The present disclosure relates generally to structures and devices. More specifically, the present disclosure relates to electrical device alignments.

BACKGROUND

In recent years, the use of electrical devices has increased dramatically. Some electrical devices have also increased in capability and/or complexity.

Many varieties of electrical devices are conveniently used in homes and businesses. Many homes and businesses include multiple electrical devices to assist in everyday tasks. For example, electrical devices may be used for convenience and/or control.

However, some electrical devices may provide poor features, poor functionality, and/or may work inconsistently. For instance, some electrical devices may be arranged poorly, may fail to work, and/or may malfunction in some cases. As can be observed from this discussion, improvements to the reliability, functionality, and/or features of electrical devices may be beneficial.

BRIEF DESCRIPTION OF THE DRAWINGS

FIG. 2 is an elevational frontal view of an example of an electrical device;

FIG. 3 is a perspective view of an example of an electrical device;

DETAILED DESCRIPTION

Figure 1:
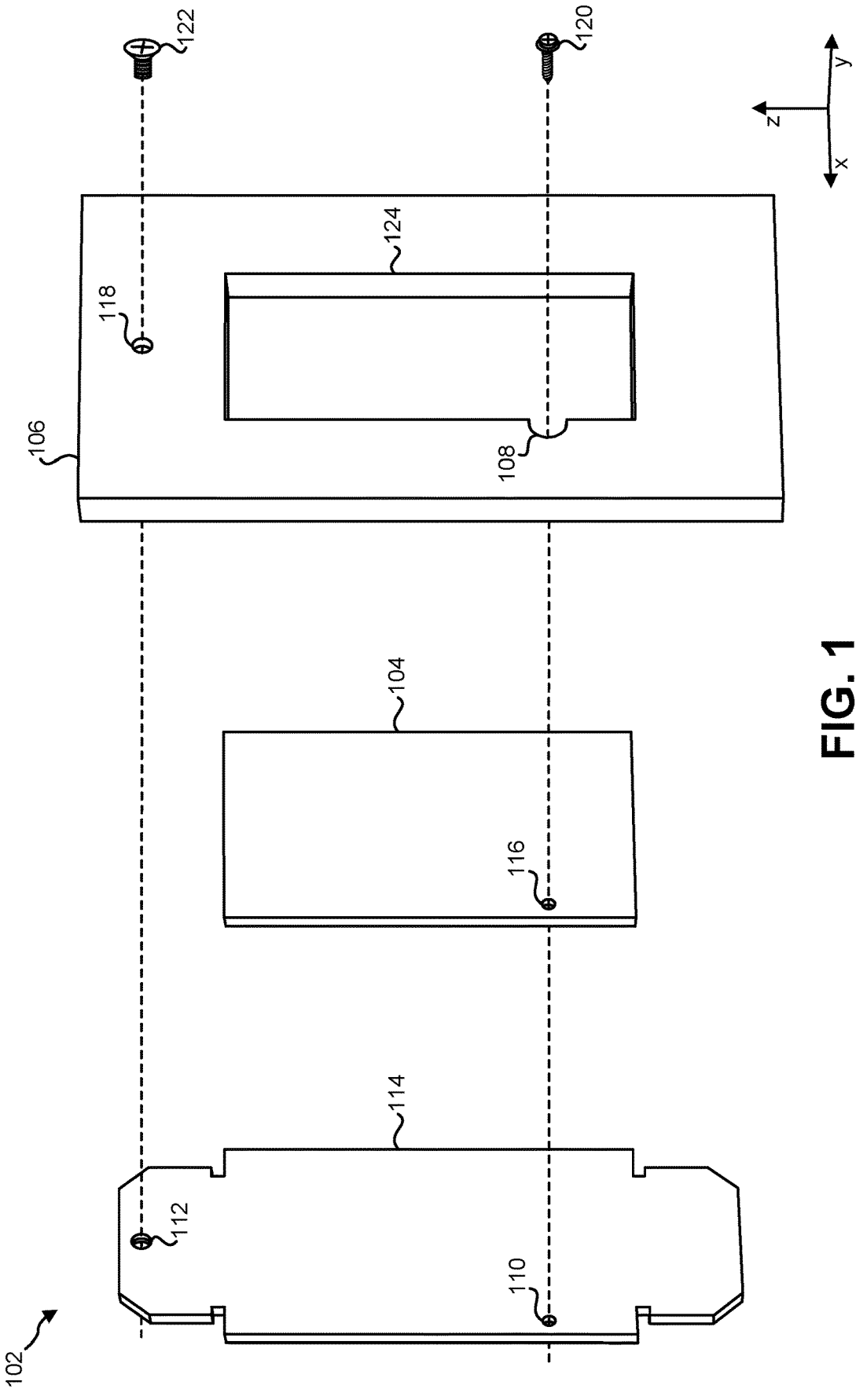
FIG. 1 is a diagram illustrating an exploded perspective view of an example of an electrical device in accordance with some of the techniques and structures described herein.

An electrical device is described. The electrical device includes a yoke plate including a first screw hole and a second screw hole. The electrical device also includes a base including a third screw hole disposed to permit passage of a first screw through the third screw hole and the first screw hole. The electrical device further includes a subplate including a fourth screw hole disposed to permit a second screw to attach the subplate to the yoke plate through the fourth screw hole and the second screw hole. The subplate includes a channel to expose the third screw hole to a facial side of the subplate.

The subplate may include a window to frame a button that is attached to the base. The channel may be an extension of the window. The channel may permit passage of a screwdriver to adjust a tension of the first screw from the facial side of the subplate. Adjusting the tension of the first screw from the facial side of the subplate may permit positioning of the base relative to the subplate while the subplate is attached to the yoke plate. The window may permit a temporary spacer to be inserted between the button and an edge of the window when the first screw is in a loosened state.

The second screw hole may be threaded. The first screw hole and the third screw hole may be unthreaded.

The electrical device may include a circuit board. The circuit board may include a screw hole to permit passage of the first screw. The circuit board may be disposed between the base and the yoke plate.

The electrical device may include a device box. The device box may include a screw hole to permit attachment of the first screw. The device box may be disposed on a back side of the yoke plate. The yoke plate may include a fifth screw hole to permit passage of a third screw to attach the yoke plate to a wall box.

A device kit is also described. The device kit includes a yoke plate including a first screw hole and a second screw hole. The device kit also includes a base including a third screw hole disposed to permit passage of a first screw through the third screw hole and the first screw hole. The device kit further includes a subplate including a fourth screw hole disposed to permit a second screw to attach the subplate to the yoke plate through the fourth screw hole and the second screw hole. The subplate includes a channel to expose the first screw to a facial side of the subplate. The electrical device additionally includes a faceplate including a snap feature to attach the faceplate to the subplate.

An electrical device is a device that operates with electricity, that controls electricity, that receives electricity, and/or that provides electricity. Examples of an electrical device include a light switch, wall switch, dimmer, control panel, push button switch, keyboard, mouse, game controller, click pad, touch pad, keypad, doorbell, thermostat, sprinkler controls, vehicle console, power outlet, wall jack, light (e.g., path light, night light, etc.), etc. Some examples of the electrical devices described herein include and/or utilize a structure(s) (e.g., button(s), switch(es), slider(s), socket(s), etc.) in a cover opening (e.g., faceplate window).

In some examples, an electrical device may include multiple components that are attachable with one or more fasteners (e.g., screw(s), snap feature(s), interfering mechanism(s), etc.). For instance, an electrical device may include layered components that are secured with screws that pass through multiple components. In some cases, components of an electrical device may be assembled with significant misalignments between components. For instance, tolerances in layered components may accumulate to cause installation errors. For example, a light switch may be assembled such that a button is misaligned relative to a faceplate of the light switch. In some examples, the misalignment may cause mechanical issues (e.g., contact and/or friction between a button and faceplate, a jammed button, strained button actuation, etc.) and/or may result in a poor installation (e.g., off-center button, loose assembly, etc.).

In some examples, an ambient light guide and/or ambient light sensor may be disposed in and/or behind a gap of an electrical device. In some examples, a misalignment between components may reduce and/or prevent light from entering the ambient light guide and/or ambient light sensor, which may cause poor performance of the ambient light sensor and/or an operation(s) based on a sensed measurement(s) from the ambient light sensor.

In some approaches, an electrical device may require disassembly (e.g., removal of one or more components) to attempt to reassemble the electrical device with improved alignment. For instance, one or more assembled components may block access to one or more fasteners of an underlying component(s). In some examples, a final alignment may rely on an inaccessible fastener(s) and removing an output component(s) may remove a reference for alignment. For instance, removing a component entirely from the electrical device and adjusting an alignment may be performed blindly. An installer may be unable to observe whether the changes to the alignment will be effective or not until the component is reinstalled.

For instance, a light switch may include a base device installed in a wall. A subplate may be attached exterior to the base device. The subplate may provide a snap platform for a faceplate that hides screws and other features. In some cases, the button may have uneven gaps in a window of the subplate and/or a window of the faceplate, which may cause a mechanical issue and/or appear off-center. The subplate may be removed to adjust the alignment, but this approach may not allow observation of the alignment until the subplate is reinstalled. Repeated blind adjustments to alignment may waste time in electrical device assembly and/or installation.

Some examples of the techniques and structures described herein may provide access to one or more interior fasteners of an electrical device. For instance, a channel may be provided in a subplate to enable electrical device alignment without disassembly (e.g., without removal of the subplate). For instance, some of the techniques and structures described herein may improve electrical device alignment(s), may reduce (e.g., eliminate) a potential mechanical issue(s), may reduce assembly (e.g., installation) time, and/or may improve installation appearance. For instance, some of the techniques and/or structures described herein may allow for alignment adjustment without iteration. Some examples of the techniques described herein may improve an electrical device alignment to avoid reducing and/or blocking light from entering an ambient light guide and/or ambient light sensor.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a diagram illustrating an exploded perspective view of an example of an electrical device 102 in accordance with some of the techniques and structures described herein. In the example of FIG. 1, the electrical device 102 includes a yoke plate 114, abase 104, and a subplate 106. In some examples, the electrical device 102 (e.g., yoke plate 114, base 104, and/or subplate 106, etc.) may be fabricated from a material(s) such as a polymer(s), thermoplastic(s), resin(s), polycarbonate(s), and/or metal(s), etc. For instance, the subplate 106 may be fabricated from a polycarbonate by injection molding and the yoke plate 114 may be fabricated from a metal by forming, machining, and/or casting. The electrical device 102 (e.g., yoke plate 114, base 104, and subplate 106) is illustrated in FIG. 1 in a height (e.g., z) dimension, a width (e.g., x) dimension, and a depth (e.g., y) dimension.

A yoke plate is a structure for mounting an electrical device. For instance, the yoke plate 114 may be utilized to attach the electrical device 102 to a mounting surface and/or mounting structure (e.g., wall, wall box, etc.). For instance, a fastener (not shown in FIG. 1) may attach the yoke plate 114 to a wall box, framing, etc. In some examples, the yoke plate 114 may support one or more components of the electrical device 102.

In some examples, the yoke plate 114 may include fastener holes. For instance, the yoke plate 114 may include a first screw hole 110 and a second screw hole 112. A fastener hole may be utilized to attach one or more components of the electrical device 102 to the yoke plate 114.

In some examples, the electrical device 102 includes a base 104. A base is a component to support a functional and/or exposed structure of an electrical device. Examples of a functional and/or exposed structure may include a button, socket, jack, port, outlet, light, etc. For instance, the base 104 may support a button. A button is a structure configured to actuate based on a physical contact (e.g., pressure, touch, push, etc.) and/or configured to detect a physical contact. In some examples, the base 104 may include a feature(s) to install and/or attach one or more buttons. For instance, the base 104 may include one or more protrusions (e.g., nubs), hinges, and/or snap features to attach one or more buttons.

In some examples, the base 104 includes a third screw hole 116 disposed to permit passage of a first screw 120 through the third screw hole 116 and the first screw hole 110. For instance, the first screw 120 may be rotated through the third screw hole 116 and the first screw hole 110 to hold the base 104 relative to the yoke plate 114. In some examples, the base 104 may include multiple third screw holes and the yoke plate 114 may include multiple first screw holes, where a screw may be disposed through each corresponding pair of screw holes.

In some examples, the electrical device 102 includes a subplate 106. A subplate is a component to support a faceplate (not shown in FIG. 1). A faceplate is a cover. For instance, a faceplate may conceal one or more components of the electrical device 102 when the faceplate is attached to the subplate 106. In some examples, a faceplate may be attached to the subplate 106 (e.g., mechanically interfaced with the subplate 106, snapped to the subplate 106, etc.) to attach the faceplate to the electrical device 102.

In some examples, the subplate 106 includes a fourth screw hole 118. The fourth screw hole 118 may be disposed to permit a second screw 122 to attach the subplate 106 to the yoke plate 114 through the fourth screw hole 118 and the second screw hole 112. While Phillips drive screws are illustrated as examples of the first screw 120 and the second screw 122, one or more other screw types may be utilized in some examples. For instance, the first screw 120 and/or the second screw 122 may have a slotted drive, star drive, combination drive, hex socket (e.g., Allen socket) drive, and/or hex head, etc. In some examples, another fastener type may be utilized. In some examples, the second screw hole 112 is threaded. For instance, the second screw 122 may be utilized to hold the subplate 106 to the yoke plate 114 without another component (e.g., without the second screw 122 penetrating into another component besides the subplate 106 and the yoke plate 114). In some examples, the first screw hole 110 is unthreaded and/or the third screw hole 116 is unthreaded. For instance, the first screw 120 may be utilized to hold the base 104 through the yoke plate 114 with another component(s) (e.g., with the first screw 120 penetrating into another component(s), such as a device box).

In some examples, the subplate 106 may include a window 124. The window 124 may be an opening in the subplate 106. In some examples, the window 124 may frame a structure of the base 104 (e.g., a structure attached to the base 104). Some examples of a structure of the base 104 may include a button (e.g., switch button, keypad button, etc.), socket, jack, port, light, etc. For instance, the window 124 may frame a button that is attached to the base 104. In some examples, a structure of the base 104 may be disposed to extend beyond the facial surface of the subplate 106. For instance, a button or another structure may be disposed to protrude through the window 124 (e.g., above a level or plane of the facial surface of the subplate 106), may be disposed approximately flush with an outer surface (e.g., facial surface) of the subplate 106, or may be disposed below (e.g., recessed below) the level (e.g., plane) of the outer surface of the subplate 106. While a button is given in some examples herein, another structure (e.g., power socket structure, jack structure, port structure, keystone jack structure, light structure, keypad structure, etc.) may be disposed in the window 124 instead of a button in some examples. In the example of FIG. 1, the window 124 is rectangular in shape. In some examples, the window 124 may be shaped differently (e.g., circularly shaped, rounded rectangularly shaped, oval shaped, irregularly shaped, curved in shape, etc.). In some examples, the subplate 106 may include multiple windows (e.g., two windows for two power outlets).

In some examples, the subplate 106 includes a channel 108 to expose the third screw hole 116 to a facial side of the subplate 106. For instance, the channel 108 may be a hole, cutout, and/or gap that provides access to the third screw hole 116 and/or the first screw 120 from the exterior of the subplate 106. In some examples, the channel 108 is an extension of the window 124. For instance, the channel 108 may be a curved, semi-circular, or rectangular deviation from the shape (e.g., rectangular shape) of the window 124. In some examples, the channel 108 may be separate from the window 124. For instance, the channel 108 may be a hole, gap, and/or slot that is separate from the opening of the window 124.

The channel 108 may be sized to permit a screwdriver and/or other tool (e.g., screwdriver bit, socket tool, power screwdriver, drill, etc.) to interface with and/or adjust the first screw 120. For instance, the channel 108 may permit passage of a screwdriver to adjust a tension of the first screw 120 from the facial (e.g., outer) side of the subplate 106.

In some examples, the channel 108 may allow for the first screw 120 to be tensioned and/or de-tensioned to adjust an alignment of the electrical device 102. For instance, the first screw 120 may be de-tensioned to allow relative motion between the subplate 106, the base 104, the yoke plate 114, and/or one or more other components (e.g., circuit board, device box, etc.) of the electrical device 102. In some examples, adjusting the tension of the first screw 120 from the facial side of the subplate 106 permits positioning of the base 104 relative to the subplate 106 while the subplate 106 is attached to the yoke plate 114. For instance, while the first screw 120 is (e.g., while multiple first screws are) de-tensioned, the base 104 may be shifted relative to the subplate 106 to align the base 104 to the subplate 106. For example, the base 104 may be shifted while the subplate 106 is held in place relative to a mounting surface and/or mounting structure.

In some examples, the window 124 and/or the channel 108 may permit one or more spacers to be inserted between a structure(s) of the base 104 and one or more edges of the window 124. For instance, the window 124 may permit a temporary spacer to be inserted between a button and an edge of the window 124 when the first screw 120 is in a loosened state. Examples of a spacer may include a credit card, a spacer tool, a plastic card, a packing material (e.g., plastic strip, metal ribbon, etc.), screwdriver, etc. In some examples, a spacer may have a thickness to establish a gap size between a structure of the base 104 and the window 124. For instance, a spacer may have a thickness between 0.25 millimeters (mm) and 2 mm (e.g., 0.76 mm, 0.8 mm, 0.9 mm, etc.). While a spacer is inserted (e.g., or spacers are inserted), the first screw 120 may be tensioned to set the alignment of the electrical device 102. In some examples, the spacer (e.g., temporary spacer) may be removed after tensioning or the spacer may remain after tensioning. In some examples, multiple spacers may be utilized. In an example, a first spacer may be inserted on a left side of a button and a second spacer may be inserted on a bottom side of a button. In another example, a first spacer may be inserted on a left side of a button and a second spacer may be inserted on a right side of a button. In another example, a first spacer may be inserted on a left side of a button, a second spacer may be inserted on a right side of a button, a third spacer may be inserted on a bottom side of a button, and/or a fourth spacer may be inserted on a top side of a button.

FIG. 2 is an elevational frontal view of an example of an electrical device 240. The electrical device 240 may be an example of the electrical device 102 described in relation to FIG. 1. One or more of the components of the electrical device 240 may be examples of one or more components described in relation to FIG. 1. As illustrated in FIG. 2, the electrical device 240 may include a subplate 226 and a button 238. The button 238 may be attached to a base beneath the subplate 226. In the example of FIG. 2, second screws 232*a-b* may attach the subplate 226 to a yoke plate behind the subplate 226. The electrical device 240 is illustrated in FIG. 2 in a height (e.g., z) dimension and a width (e.g., x) dimension.

The subplate includes channels 228*a-d*. In the example of FIG. 2, the channels 228*a-d* are extensions of a window 234. For instance, the channels 228*a-d* are deviations from a rectangular shape of the window 234 to accommodate the button 238. For example, the channels 228*a-d* enlarge or extend the window 234 of the subplate 226 beyond a size and/or shape of the button 238 with margin to accommodate the button 238.

In the example of FIG. 2, first screws 230*a-d* are disposed through holes in the base behind the subplate 226. The first screws 230*a-d* are accessible from the front of the subplate 226 through the channels 228*a-d*. During assembly and/or installation, the base (e.g., button 238) may be aligned with the subplate 226. For instance, the first screws 230*a-d* may not be completely tensioned and/or may be de-tensioned to allow relative movement between the base (e.g., button 238) and the subplate 226. In some cases, one or more of the first screws 230*a-d* may not be removed completely and/or may be placed in a de-tensioned (e.g., loosened) state. A temporary spacer (e.g., card) may be placed in a gap 236 between the button 238 and the subplate 226 to produce a target spacing in the gap 236. The first screws 230*a-d* may be tensioned to set the position of the base (e.g., button 238) relative to the subplate 226 and/or to produce a target alignment between the base (e.g., button 238) and the subplate 226. When a faceplate is installed on the subplate 226, the button 238 may be aligned with the faceplate, which may be disposed relative to the subplate 226 (e.g., may inherit positioning from the subplate 226).

FIG. 3 is a perspective view of an example of an electrical device 340. The electrical device 340 may be an example of the electrical device 102 described in relation to FIG. 1 and/or an example of the electrical device 240 described in relation to FIG. 2. One or more of the components of the electrical device 340 may be examples of one or more components described in relation to FIG. 1 and/or FIG. 2.

The electrical device 340 is illustrated in FIG. 3 in a height (e.g., z) dimension, a width (e.g., x) dimension, and a depth (e.g., y) dimension.

The electrical device 340 illustrated in FIG. 3 is shown without a subplate (e.g., subplate 226). The electrical device 340 may include a button 338, a base 344, a circuit board 358, a yoke plate 342, a device box 354, and/or one or more other components. The button 338 may be attached to the base 344. For example, the button 338 includes a tab 346 with an opening to interface with (e.g., snap onto) a protrusion 348 (e.g., nub) of the base 344. Another fastener(s) and/or fastening mechanism(s) may be utilized in some examples. While a single button 338 is illustrated in FIG. 3, multiple buttons may be attached to a base in some examples.

In the example of FIG. 3, second screws 332*a-b* may be utilized to attach a subplate to the yoke plate 342. In some examples, a yoke plate may include a fifth screw hole to permit passage of a third screw to attach the yoke plate to a mounting surface and/or mounting structure. For instance, the yoke plate 342 includes fifth screw holes (e.g., fifth screw hole 356) to permit passage of third screws 350*a-b* to attach the yoke plate 342 to a wall box. In some examples, the device box 354 may fit within and/or may be housed within a wall box.

In some examples, one or more of the electrical devices described herein (e.g., electrical device 102, 240, 340, etc.) may be configured to be contained within a wall box and/or attached to a wall box. A wall box (e.g., electrical box, outlet box, switch box, pattress, etc.) is a container capable of housing the body of an electrical device (e.g., light switch, power outlet, dimmer, etc.). While housed in the wall box, a subplate and/or faceplate of the electrical device may be disposed in contact with (e.g., on, against, etc.) a wall. In some examples, the width of a wall box may be measured in "gangs," which indicates the number of electrical devices (e.g., light switches, power outlets, dimmers, etc.) that the wall box can hold. For example, a single-gang wall box may hold a single electrical device and a double-gang wall box may hold two electrical devices (side by side, for example). The depth of a wall box may be standard depth, shallow depth, or deep depth. In some configurations of the systems and methods disclosed herein, a wall box may be a single-gang standard depth wall box and a wall box device may be an electrical device that may be held in a single-gang standard depth wall box. In one configuration, a European style wall box having a width of 86 millimeters, a height of 86 millimeters and a depth of 35 millimeters may be used. In another configuration, a United States style, single-gang, standard depth wall box may be used. It should be noted that other configurations of the systems and methods disclosed herein may not be housed in a wall box. For example, some configurations of the systems and methods disclosed herein may be implemented in lighting devices that are not housed in wall boxes. Additionally or alternatively, a spacing structure may be utilized in some configurations that places a portion of the device (e.g., an electrical device 340) outside of a wall box.

In the example of FIG. 3, first screws 330*c-d* are disposed through holes in the base 344. When a subplate is attached, for instance, the first screws 330*c-d* may be accessible from the front of the subplate through channels. In some examples, the electrical device 340 includes a circuit board 358. The circuit board 358 may include a screw hole(s) to permit passage of a first screw(s) (e.g., first screws 330*c-d* and/or another first screw(s)). In some examples, the circuit board 358 may be disposed between the base 344 and the yoke plate 342. In some examples, the circuit board 358 may include one or more light sources (e.g., light-emitting diode(s) (LED(s))). The light source(s) may be configured to provide backlighting for the button 338.

In some examples, the electrical device 340 includes a device box 354. The device box 354 may include a screw hole(s) to permit passage of a first screw(s) (e.g., first screws 330*c-d* and/or another first screw(s)). In some examples, the device box 354 may be disposed behind the yoke plate 342 (e.g., on a back side of the yoke plate 342). In some examples, the device box 354 may house circuitry (e.g., circuitry other than the circuit board 358). In some examples, the electrical device 340 may include more or fewer layered components that those described in relation to FIG. 3.

During assembly and/or installation, the base 344 (e.g., button 338) may be aligned with a subplate. For instance, the first screws 330*c-d* may not be completely tensioned and/or may be de-tensioned to allow relative movement between the base 344 (e.g., button 338) and the subplate. In some examples, the first screws 330*c-d* may not be completely tensioned and/or may be de-tensioned to allow relative movement between the yoke plate 342 and one or more of the button 338, base 344, circuit board 358, device box 354, and/or another layered component(s).

In some examples, the electrical device 340 may include an ambient light guide 352 and/or an ambient light sensor (not shown in FIG. 3). In some examples, the ambient light guide 352 may be disposed to reside behind a gap between the button 338 and a faceplate. For instance, the ambient light guide 352 may be disposed behind a space (e.g., the gap) between an edge of the button 338 and an edge of faceplate (e.g., edge of a faceplate window). In some examples, the ambient light guide 352 may be disposed behind a space between an inner (e.g., bottom) edge or surface of a faceplate window and an outer (e.g., bottom) edge or surface of the button 338 (or another structure). In some examples, the ambient light guide 352 may be disposed next to a subplate (e.g., above a bottom edge of the window 234 of the subplate 226) in the height dimension. In some examples, the ambient light guide 352 may be disposed at a depth of 1 centimeter (cm) or less (e.g., 3 mm, 2 mm, 1 mm, <1 mm, etc.) from a facial surface of the faceplate. In some examples, the ambient light guide 352 may be disposed adjacent to (e.g., below) a bottom edge and/or surface of the button 338 or another structure. In some examples, the gap may provide a margin to house the button 338, may provide clearance for mechanical movement of the button 338, and/or may provide light passage to the ambient light guide 352. In some examples, the gap may satisfy multiple conditions concurrently (e.g., mechanical button clearance and light passage). In some examples, the gap may extend across a dimension (e.g., over the whole width dimension) of the button 338 or another structure.

The ambient light guide 352 may be disposed to collect ambient light to pass through the gap. For instance, some of the ambient light in the environment may pass through the gap to the ambient light guide 352. The ambient light guide 352 may conduct (e.g., carry, transmit, etc.) the ambient light from the environment to an ambient light sensor. In some examples, the ambient light guide 352 may be fabricated from a transparent material (e.g., polycarbonate). A transparent material may be a material that permits the conduction, carrying, and/or transmission of light. In some examples, a transparent material may be completely or partially transparent. For instance, the ambient light guide 352 may be fabricated with polycarbonate 945 (without an additive(s), for example) or fabricated with polycarbonate 945 with an additive (e.g., tint, coloring, whitening agent, R69, "milkiness," etc.).

The ambient light sensor may be configured to sense the ambient light collected by the ambient light guide 352. For instance, the ambient light sensor may be a photosensitive device(s) (e.g., photoelectric circuitry, photoresistor(s), photodiode(s), photocapacitor(s), phototransistor(s), charge-coupled device (CCD) sensor, complementary metal oxide semiconductor (CMOS) sensor, etc.). In some examples, the ambient light sensor may produce a voltage and/or current that varies based on the brightness of light on the ambient light sensor. The ambient light sensor may produce one or more sensed measurements indicating an ambient light level (e.g., brightness, lumens, etc.).

In some examples, the electrical device 102 may include circuitry (e.g., the circuit board 358 and/or other circuitry housed in the device box 354) to perform one or more operations based on the sensed measurement(s). For instance, the ambient light sensor may provide the sensed measurement(s) to the circuitry, which may perform an operation(s) based on the sensed measurement(s). Some examples of the circuitry may include a controller, processor (e.g., microprocessor), state machine, field-programmable gate array (FPGA), application-specific integrated circuit (ASIC), switch(es), multiplexer(s), lookup table(s) (LUT(s)), etc. Examples of operations may include controlling a backlight level, controlling a light level, sending the sensed measurement(s) to another device(s) (e.g., home automation controller, server, network(s), etc.). For instance, the electrical device 340 may include a light source(s) (e.g., LED(s)). The electrical device 340 (e.g., circuitry) may control the light source(s) to control a light level and/or backlight level based on the sensed measurement(s). For example, the circuitry (e.g., controller) may determine (e.g., look up) a light level setting based on a sensed measurement. In some examples, the circuitry (e.g., controller) may adjust the light level according to the determined light level setting. For instance, the electrical device 340 may include a controller configured to control a backlight of the electrical device 340 based on a sensed measurement of the ambient light produced by the ambient light sensor.

In some examples, the electrical device 340 may include a communication interface. For instance, the electrical device 340 may include a wired and/or wireless communication interface (e.g., Wi-Fi interface, Zigbee interface, Bluetooth interface, Universal Serial Bus (USB) interface, Ethernet interface, and/or power-line communication (PLC) interface, etc.). In some examples, the circuitry (e.g., controller) may send the sensed measurement(s) to another device(s) (e.g., home automation controller, server, network, etc.) using the communication interface. For instance, a sensed measurement(s) may be sent to a home automation controller and/or server to control lighting based on the sensed measurement(s). In some examples, a home automation controller may activate outdoor lighting when a sensed measurement indicates an ambient light level below a threshold.

Some examples of the techniques and/or structure described herein may provide an electrical device alignment to help ensure a gap to allow passage of light to the ambient light guide 352. For instance, one or more of the first screws 330*c-d* may be de-tensioned. A temporary spacer may be placed between the button ambient light guide 352 and a subplate (e.g., subplate 226) to produce a target spacing in the gap. The first screws 330*c-d* may be tensioned to set the position of the base 344 (e.g., ambient light guide 352 and/or button 338) relative to the subplate and/or to produce a target alignment between the base 344 (e.g., ambient light guide 352 and/or button 338) and the subplate. When a faceplate is installed on the subplate, a gap with a target size between the button 338 and the faceplate may be preserved, which may provide a passage for light to the ambient light guide 352. In some examples, providing a target gap size and/or alignment may help to ensure ambient light collection and/or ambient light sensing for one or more operations (e.g., backlight control).

Figure 4:
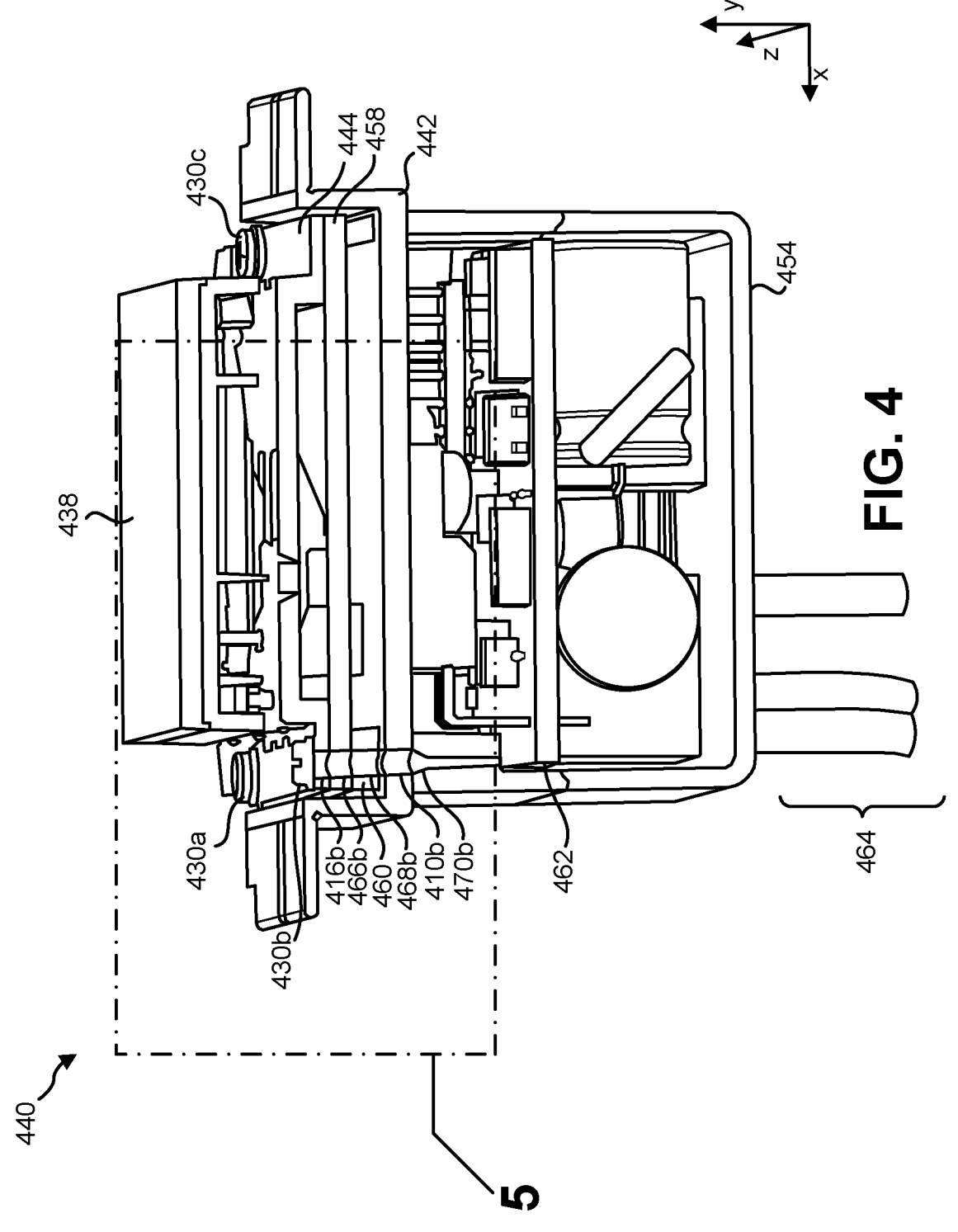
FIG. 4 is a bottom-up cross-sectional perspective view of an example of an electrical device.

FIG. 4 is a bottom-up cross-sectional perspective view of an example of an electrical device 440. The electrical device 440 may be an example of one or more of the electrical devices 102, 240, 340 described in relation to one or more of FIGS. 1-3. One or more of the components of the electrical device 440 may be examples of one or more components described in relation to one or more of FIGS. 1-3. The electrical device 440 is illustrated in FIG. 4 in a height (e.g., z) dimension, a width (e.g., x) dimension, and a depth (e.g., y) dimension.

The electrical device 440 illustrated in FIG. 4 is shown without a subplate (e.g., subplate 226). The electrical device 440 may include a button 438, a base 444, a circuit board 458, a yoke plate 442, a platform 460, a device box 454, circuitry 462, and/or wires 464. One or more of the wires 464 may be utilized to supply the electrical device 440 with power (e.g., to couple the electrical device 440 to an electrical source, such as mains electricity). The button 438 may be attached to the base 444.

In the example of FIG. 4, first screws 430*a-c* are disposed through holes (e.g., first screw 430*b* through base screw hole 416*b*) in the base 444. When a subplate is attached, for instance, the first screws 430*a-c* may be accessible from the front of the subplate through channels. In some examples, the electrical device 440 includes a circuit board 458. The circuit board 458 may include a screw hole(s) (e.g., board screw hole 466*b*) to permit passage of a first screw(s) (e.g., first screw 430*b*).

In some examples, the electrical device 440 may include a platform(s) (e.g., platform 460). In some examples, a platform 460 may be disposed between the circuit board 458 and the yoke plate 442. The platform 460 may support the circuit board 458 and/or space the circuit board 458 from the yoke plate 442 (e.g., from a bottom of a yoke plate 442 well or recess). The platform 460 may include a screw hole(s) (e.g., platform screw hole 468*b*) to permit passage of a first screw(s) (e.g., first screw 430*b*). The yoke plate 442 may include a screw hole(s) (e.g., yoke plate screw hole 410*b*) to permit passage of a first screw(s) (e.g., first screw 430*b*).

In some examples, the electrical device 440 includes a device box 454. The device box 454 may include a screw hole(s) (e.g., box screw hole 470*b*) to permit passage of a first screw(s) (e.g., first screw 430*b*). For instance, the box screw hole 470*b* may permit attachment of the first screw 430*b*. In some examples, the device box 454 may be disposed behind the yoke plate 442 (e.g., on a back side of the yoke plate 442). In some examples, the device box 454 may house circuitry 462.

In some examples, one or more of the screw holes (e.g., base screw hole 416*b*, board screw hole 466*b*, platform screw hole 468*b*, yoke plate screw hole 410*b*, and/or box screw hole 470*b*) may be unthreaded. In some examples, one or more screws (e.g., threads of the first screw 430*b*) may cut a spiral pattern in the device box 454 (e.g., box screw hole 470*b*) to grip the device box 454 and/or hold (e.g., compress) one or more layered components (e.g., the base 444, circuit board 458, platform 460, and/or yoke plate 442)

when under tension. In some examples, tolerances (e.g., extra screw hole diameter(s)) in the layered components may allow for passage of a screw, while permitting some variation in relative positioning between components. Some examples of the techniques and structures herein may enable aligning one or more components of an electrical device (e.g., alleviating a potential misalignment allowed by the tolerances).

Figure 5:
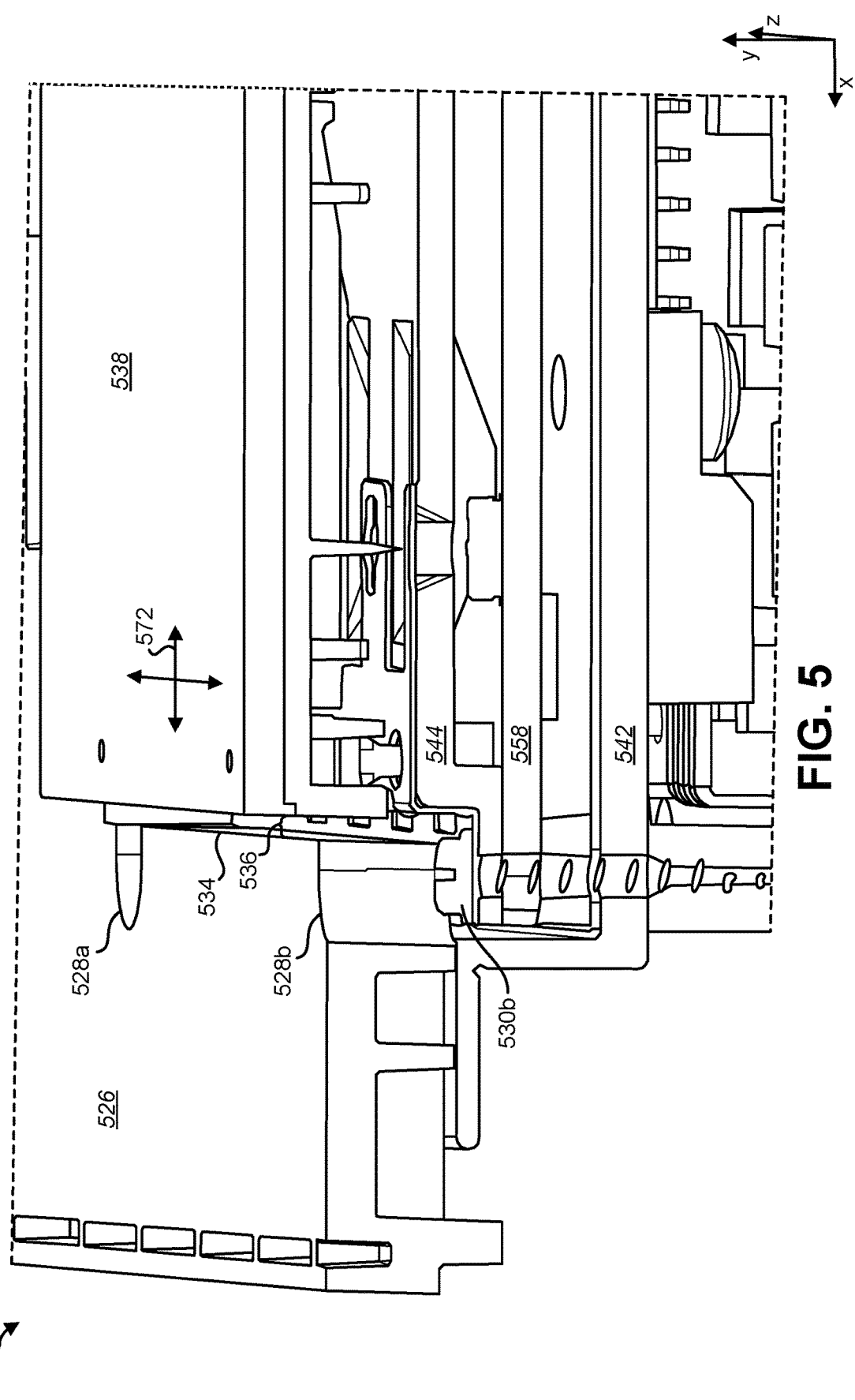
FIG. 5 is a bottom-up cross-sectional enlarged perspective view of an example of an electrical device of a region of the electrical device described in relation to FIG. 4.

FIG. 5 is a bottom-up cross-sectional enlarged perspective view of an example of an electrical device 540 of a region 5 of the electrical device 440 described in relation to FIG. 4. The electrical device 540 may be an example of one or more of the electrical devices 102, 240, 340, 440 described in relation to one or more of FIGS. 1-4. One or more of the components of the electrical device 540 may be examples of one or more components described in relation to one or more of FIGS. 1-4. The electrical device 540 is illustrated in FIG. 5 in a height (e.g., z) dimension, a width (e.g., x) dimension, and a depth (e.g., y) dimension.

The electrical device 540 illustrated in FIG. 5 is shown with a subplate 526. The electrical device 540 may include a button 538, a base 544, a circuit board 558, a yoke plate 542, a platform, a device box, and/or other components. The button 538 may be attached to the base 544.

In the example of FIG. 5, first screws are disposed through holes (e.g., first screw 530b through a base screw hole) in the base 544. The first screws (e.g., first screw 530b) may be accessible from the front of the subplate 526 through channels 528a-b (e.g., channel 528b). In some examples, the first screws may be disposed through holes of one or more layered components (e.g., circuit board 558 and/or yoke plate 542, etc.) as described in relation to FIG. 4.

During assembly and/or installation, the base 544 (e.g., button 538) may be aligned relative to the subplate 526. For instance, the first screws (e.g., first screw 530b) may not be completely tensioned and/or may be de-tensioned to allow relative movement 572 between the base 544 (e.g., button 538 and/or a layered component(s)) and the subplate 526. In some examples, the base 544 (e.g., button 538) may be aligned by adjusting a gap 536 between the button 538 and the subplate 526 (e.g., approximately equalizing the gap 536 on different sides of the button 538). For instance, a spacer may be inserted in the gap 536 to produce a target spacing size. The first screws (e.g., first screw 530b) may be tensioned (e.g., tightened) to set the position of the base 544 (e.g., button 538 and/or one or more other layered component(s)). When the first screws are tensioned, a faceplate may be attached to the subplate 526. The faceplate may cover the channels 528a-b and/or may allow the button 538 (or another structure) to be disposed in (e.g., through) a window 534 of the faceplate.

Figure 6:
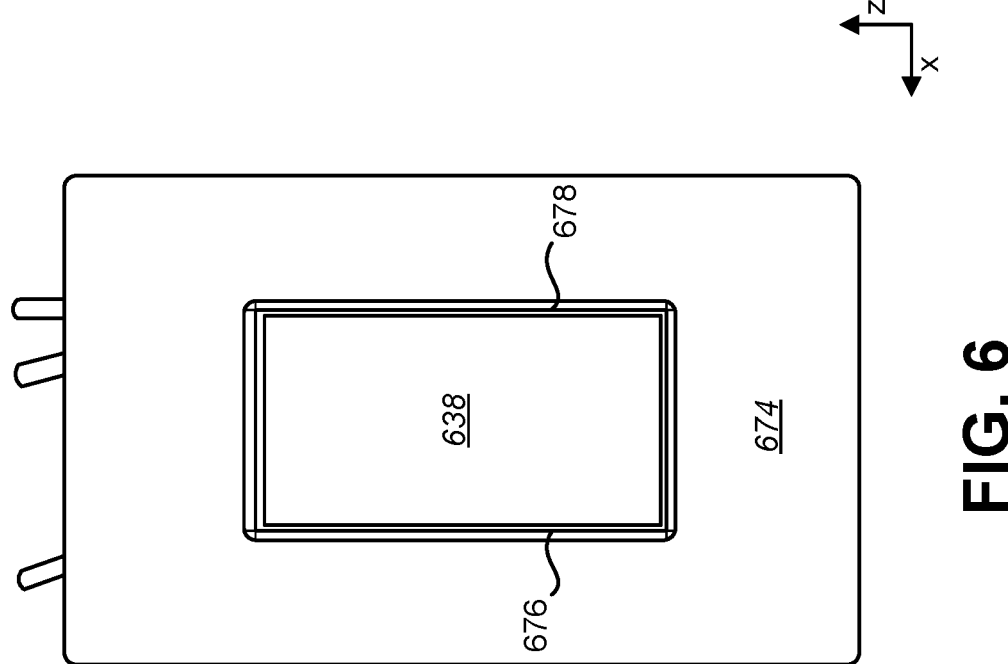
FIG. 6 is a front view of an example of the electrical device with a button and a face plate.
Figure 6:
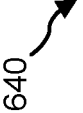

FIG. 6 is a front view of an example of the electrical device 640 with a button 638 and a face plate 674. The button 638 may be an example of one or more of the buttons described herein. In some examples, the face plate 674 may be attached to the electrical device 640. For instance, a subplate (not shown in FIG. 6) may be attached to the electrical device 640 (e.g., may be screwed to a yoke plate of the electrical device 640). The face plate 674 may be attached to the subplate (e.g., mechanically interfaced with the subplate, snapped to the subplate, etc.).

In some examples, the electrical device 640 may be configured to be partially contained within a wall box and/or attached to a wall box. Aligning the electrical device 640 in accordance with some of the techniques and/or structures described herein may approximately equalize a gap 676 around the button 638 and/or may approximately center the button 638 within a window 678 of the faceplate (in one or more dimensions, for instance).

In some examples, one or more of the components described herein may be included in a device kit. A device kit is a set of components for assembly and/or installation. For instance, a device kit may include components (e.g., yoke plate, base, structure of the base, subplate, circuit board, circuitry, device box, wires, fastener(s) (e.g., screw(s)), faceplate, and/or another component(s)) that may be unassembled, partially assembled, and/or uninstalled. An installer may assemble and/or install the set of components. In some examples, a user (e.g., installer, technician, consumer, etc.) may perform one or more of the actions described herein to align components of a device kit. In some examples, a device kit may be packaged together for distribution to a user. In some examples, an assembled and/or installed device kit may produce an installed electrical device in accordance with one or more of the techniques and/or components described herein.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The method(s) disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. An electrical device, comprising:
   a yoke plate comprising a first screw hole and a second screw hole;
   a base comprising a third screw hole disposed to permit passage of a first screw through the third screw hole and the first screw hole; and
   a subplate comprising a fourth screw hole disposed to permit a second screw to attach the subplate to the yoke plate through the fourth screw hole and the second screw hole, wherein the subplate comprises a channel to expose the third screw hole to a facial side of the subplate and to permit tool access while the subplate remains attached to the yoke plate, wherein the subplate comprises a window to frame a button that is attached to the base, and wherein the channel is an extension of the window and permits passage of a screwdriver to adjust a tension of the first screw from the facial side of the subplate such that adjusting the tension of the first screw from the facial side of the subplate permits positioning of the base relative to the subplate while the subplate is attached to the yoke plate, and wherein the base and the subplate are distinct structural members each directly fastened to the yoke plate by separate fasteners.

2. The electrical device of claim 1, wherein the second screw hole is threaded, and wherein the first screw hole and the third screw hole are unthreaded.

3. The electrical device of claim 1, further comprising a circuit board, wherein the circuit board comprises a screw hole to permit passage of the first screw, and wherein the circuit board is disposed between the base and the yoke plate.

4. The electrical device of claim 1, further comprising a device box, wherein the device box comprises a screw hole to permit attachment of the first screw, and wherein the device box is disposed on a back side of the yoke plate.

5. The electrical device of claim 1, wherein the yoke plate further comprises a fifth screw hole to permit passage of a third screw to attach the yoke plate to a wall box.

6. A device kit, comprising:

a yoke plate comprising a first screw hole and a second screw hole;

a base comprising a third screw hole disposed to permit passage of a first screw through the third screw hole and the first screw hole;

a subplate comprising a fourth screw hole disposed to permit a second screw to attach the subplate to the yoke plate through the fourth screw hole and the second screw hole, wherein the subplate comprises a channel to expose the first screw to a facial side of the subplate and to permit tool access while the subplate remains attached to the yoke plate, wherein the subplate comprises a window to frame a button when the device kit is assembled, and wherein the channel is an extension of the window and permits passage of a screwdriver to adjust a tension of the first screw from the facial side of the subplate such that adjusting the tension of the first screw from the facial side of the subplate permits positioning of the base relative to the subplate while the subplate is attached to the yoke plate, wherein the base and the subplate are distinct structural members each directly fastened to the yoke plate by separate fasteners; and a faceplate comprising a snap feature to attach the faceplate to the subplate, wherein the base and the subplate are distinct structural members each directly fastened to the yoke plate by separate fasteners.

7. The device kit of claim 6, wherein the second screw hole is threaded, and wherein the first screw hole and the third screw hole are unthreaded.

8. The device kit of claim 6, further comprising a circuit board, wherein the circuit board comprises a screw hole to permit passage of the first screw, and wherein the circuit board is disposed between the base and the yoke plate.

9. The device kit of claim 6, further comprising a device box, wherein the device box comprises a screw hole to permit attachment of the first screw, and wherein the device box is disposed on a back side of the yoke plate when the device kit is assembled.

10. The device kit of claim 6, wherein the yoke plate further comprises a fifth screw hole to permit passage of a third screw to attach the yoke plate to a wall box.

11. The electrical device of claim 1, wherein a loosened state of the first screw enables aligning of a structure related to the base.

12. The device kit of claim 6, wherein a loosened state of the first screw enables aligning of a structure related to the base.

* * * * *